Figure 1:
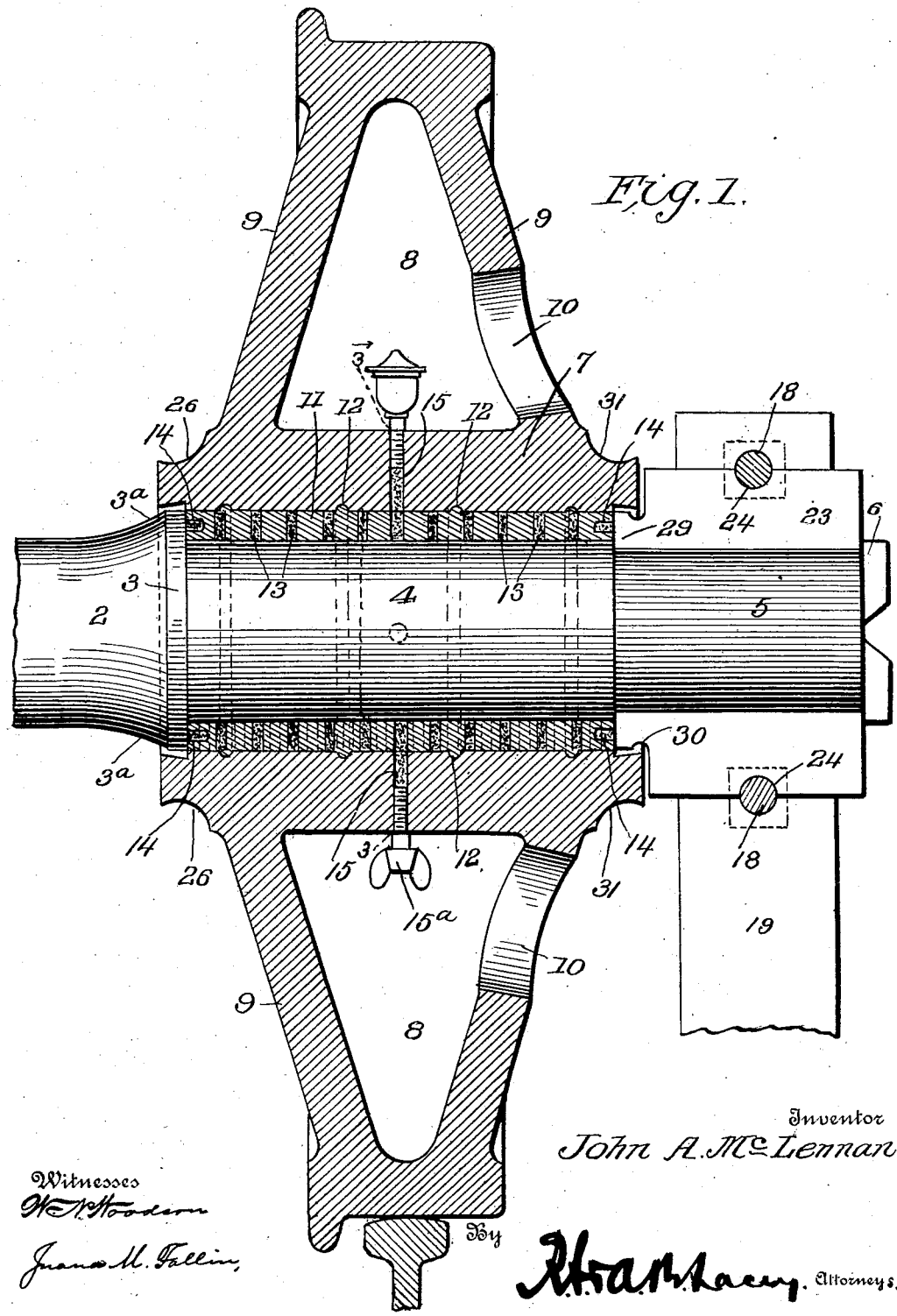

J. A. McLENNAN.
RAILWAY CAR WHEEL.
APPLICATION FILED APR. 25, 1910.

968,879.

Patented Aug. 30, 1910.
2 SHEETS—SHEET 1.

Witnesses
W. T. Hooder
James M. Fallin

Inventor
John A. McLennan
By
H. T. A. Lacey, Attorneys.

J. A. McLENNAN.
RAILWAY CAR WHEEL.
APPLICATION FILED APR. 25, 1910.
968,879.
Patented Aug. 30, 1910.
2 SHEETS—SHEET 2.
Fig. 2.
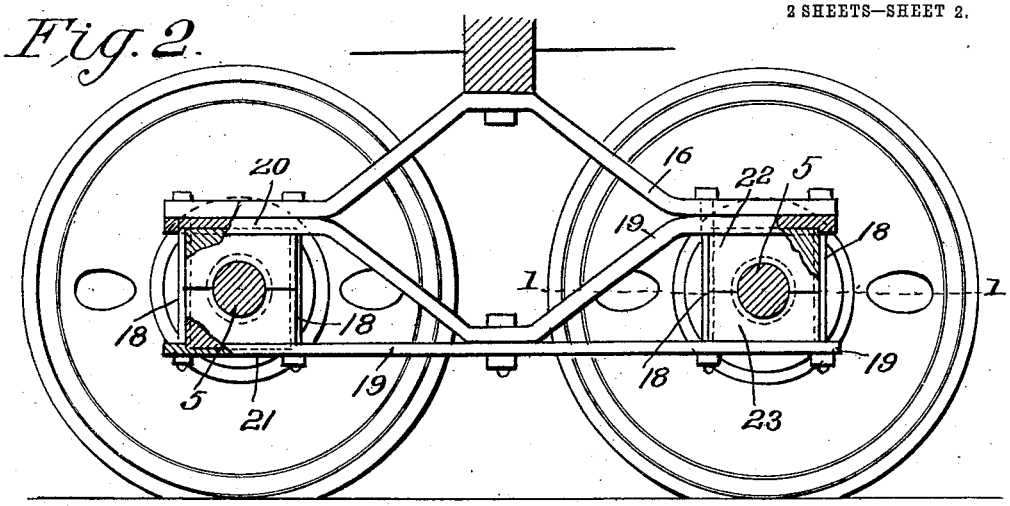
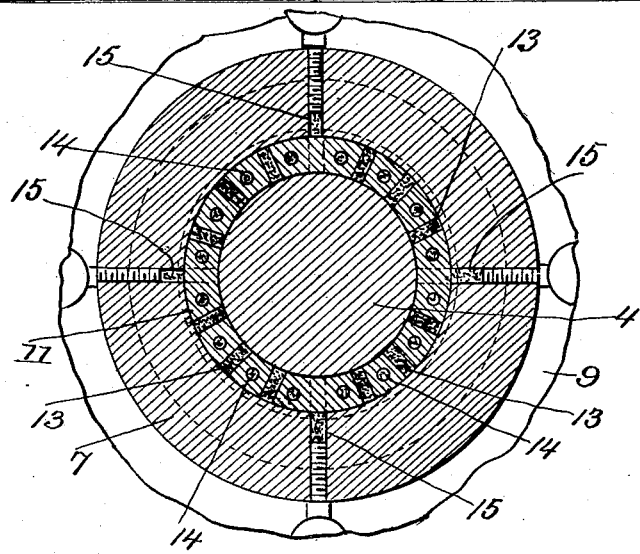
Fig. 3.
Inventor
John A. McLennan

UNITED STATES PATENT OFFICE.

JOHN A. McLENNAN, OF CHICAGO, ILLINOIS.

RAILWAY-CAR WHEEL.

968,879.

Specification of Letters Patent.

Patented Aug. 30, 1910.

Application filed April 25, 1910. Serial No. 557,547.

*To all whom it may concern:*

Be it known that I, JOHN A. MCLENNAN, citizen of the United States, residing at Chicago, in the county of Cook and State of Illinois, have invented certain new and useful Improvements in Railway-Car Wheels, of which the following is a specification.

My invention relates to vehicle wheels and particularly to wheels for railway cars and means for mounting them.

One of the objections incident to car wheels which are fast to the axle and do not turn independently thereof is that if there is a slight difference in diameter between one wheel or the other, or if the wheels are running upon a curve one wheel will rotate at a less speed than the other and will consequently drag. This dragging action not only requires the expenditure of additional power but wears down the smaller wheel still further so that the dragging action is increased. It is required, therefore, for a proper condition of operation that both wheels shall be of exactly the same diameter, at least on straight track. But this in general railroad practice is never found, for after the wheels are put in place one is very liable to wear more than the other, in consequence of defective casting, or the material of one wheel being slightly softer than the other, or a variety of circumstances which tend to prevent absolute equality between the wheels.

The primary object of my invention is to overcome this objection and these disadvantages, and permit each wheel to have its own independent operation upon a fixed axle, thus eliminating the wear and tear on the wheel, decreasing the amount of power expended in dragging the train and very greatly decreasing the cost of maintenance. This waste of car wheels, oil and power expended in hauling the cars is entirely overcome by my improved wheel.

A further object is to provide a car wheel which shall be so mounted on the axle that the bearing face of the axle shall be properly lubricated and provided with a constant supply of graphite so as to provide a journal bearing in which the car wheel will be subjected to the least possible friction.

A still further object is to provide a wheel of this construction with dust guards preventing the entrance of dust and dirt between the bearing face of the wheel and axle, and which shall tend to deflect any dust or dirt which would otherwise lodge upon the axle.

For a full understanding of the invention reference is to be had to the following description and accompanying drawings, in which:—

Figure 1 is a horizontal section on the line 1—1 of Fig. 2; Fig. 2 is a side elevation of a car truck of two of my wheels applied thereto; Fig. 3 is a transverse section on the line 3—3 of Fig. 1.

Corresponding and like parts are referred to in the following description and indicated in all the views of the accompanying drawings by the same reference characters.

Referring to these figures 2 designates a steel car axle which is provided inward of its end with oppositely disposed inner annular shoulders 3. It will be seen from Fig. 1 that the middle portion of the car axle merges into said shoulders 3 by a curved surface. This gradual enlargement of the axle and its mergence into the shoulder 3 is of particular moment, as will be later described. The bearing portion 4 of the axle has practically the same diameter as the main part thereof. The ends of the axle beyond the bearing portion 4 are reduced as at 5 for engagement with the hanger blocks of the truck, and at each end, the axle is formed with the outwardly projecting annular shoulder 6.

Both wheels are of the same form, and hence a description of one will apply equally well to the other. Each wheel consists of the hub 7 which is longer than the bearing portion 4 of the axle end and projects beyond the same. The wheel is hollow or formed with an annular chamber 8. Two annular webs 9 are thus provided, these converging toward the tread of the wheel. One of these webs, that is the outer web is provided with the hand-hole 10.

The diameter of the wheel hub 7 is larger than the bearing portion 4 of the axle, and the interior of the hub is provided with a bushing 11 preferably of bronze. This bushing is of the same length as the bearing portion 4 of the axle and rotates therearound and with the wheel. In order to hold the bushing in place within the hub so as to prevent any relative longitudinal movement of the hub and bushing I preferably form the interior face of the hub with a plurality of circumferential grooves 12. The bushing is cast into the hub around a suitable core, and as a consequence fills these grooves, and thus the bushing and hub are held in rigid engagement with each other, so that the bushing and hub cannot shift laterally.

In order to lubricate the bearing surface of the bushing and axle, the bushing is provided with a large number of radial storage cells 13, each of about a quarter of an inch in diameter, the storage cells being disposed in staggered relation. The bushing at its opposite ends is also provided with a plurality of longitudinally extending storage cells 14. These storage cells 13 and 14 are intended to be filled and packed tightly with the best graphite mixed with clean mutton tallow. This mixture of graphite and mutton tallow will be of the consistency of stiff putty, and will be put into the cells at the temperature a little below boiling. This mixture becomes relatively hard, but under the impulse of heat the mixture expands and the graphite will be forced out against the face of the bearing portion 4 of the axle. It will be seen that practically every portion of the axle will be thoroughly lubricated by means of these storage cells. The axle will not be merely lubricated at one point, but practically along its entire length. The end cells 14 will of course, lubricate the face of the shoulder 3, and the inner faces of the hanger blocks 22, 23. The hub 7 of the wheel is provided with four radially extending passages 15 which communicate with four of the storage cells 13. These passages 15 are each interiorly screw-threaded for engagement with a thumb-screw 15ᵃ, whereby the graphite may be forced through the passages 15 to the bearing. It is obvious, however, that these passages 15 might be connected to an oil cup or any other means for distributing lubricant to the outer face of the axle. Thus the chamber 8 might be filled with oil soaked waste, the oil from which will be conducted through the passages 15 to the face of the axle.

The truck hangers designated 16 and 17 are of any usual construction, and from them depend the bolts 18. These bolts at their lower ends are connected to the hanger plates 19. The under face of the hanger plate 17 and the upper face of the hanger plate 19 are both longitudinally grooved as at 20 and 21 for engagement with the upper and under faces of the upper and lower hanger blocks.

Supported between the hanger plate 19 and the hanger plate 17 and clamped in place by means of the bolts 18 are the upper and lower hanger blocks 22 and 23. These hanger blocks at their ends are cut away as at 24 to receive the bolts 18, the bolts 18 acting to hold the hanger blocks in place. The length of each hanger block is equal to the distance between the shoulder 6 and the outer end face of the bearing portion 4 of the axle, thus the inner end of each hanger block bears against the outer end of the bushing 11.

As before stated, the hub 7 projects at each end beyond the bushing 11. At its inner end the hub is cut away so as to form an annular recess having an undercut wall, this recess being slightly larger than the shoulder 3 on the axle, and the hub projecting somewhat beyond said shoulder and overlapping the curved portion 3ᵃ of the axle. A dust guard is thus formed on the inner end of the hub which tends to prevent the collection of dust between the outer face of the bushing 11. It will be seen that the gradual outward curvature of the axle designated 3ᵃ acts to deflect any dust or dirt which may fall from the hub so that the dust and dirt will be carried toward the middle of the axle, and furthermore, it is pointed out that this gradually enlarged portion 3ᵃ tends to brace the shoulder 3 and make it particularly capable of resisting side-wise thrust. Preferably, also the inner end of the hub is annularly cut away, or grooved, as at 26 to form a gutter in which any dust or dirt passing down the webs 9 may collect, this gutter acting to obstruct the passage of the dirt onto the axle. The outer end of the hub also projects beyond the outer extremity of the bushing 11, being annularly cut away or recessed as at 28. The inner ends of the hanger blocks are reduced as at 29, the diameter of this reduced portion 29 of the hanger blocks being less than the interior diameter of the recess 28. This reduced portion 29 is also formed with a circumferential groove or gutter 30 which is in alinement with the outer end of the hub. This projecting end 27 of the hub acts to form a dust cap or guard, which will prevent the entrance of dust into the space between the axle and the bushing 11. The dirt or dust which may accidentally pass in between the meeting faces of the hub and hanger blocks will be caught within the gutter 30 and held therein. The outer end of the hub is also formed with a circumferential groove 31 which is practically the same as the groove 26 and fulfils the same functions, that is, of deflecting any dirt which may work down upon the web 9, and preventing the dirt from passing into the space between the hanger block and the end of the axle.

While I have shown my improved wheel as drawn to a scale calculated for a forty ton capacity American built railroad freight car, it will of course be obvious that many changes might be made to accommodate the wheel to any other size and shape of car without departing from the spirit of the invention.

It will be seen that my invention not only provides for an independent movement of both wheels upon the axle, and for a proper lubrication of the axle of said wheel, but also provides for a ready removal of the wheels if at any time they become damaged or so worn that new wheels must be substituted. It will be obvious that it would be a comparatively small operation to jack-up a car and remove the old wheel and replace it with a new one, whereas to entirely remove an axle and both wheels, is an operation which cannot be performed easily without the assistance of a wrecking car or shop appliances.

Having thus described the invention what is claimed as new is:—

1. The combination with the axle of a railway car having opposed shoulders at opposite ends thereof, and a bearing portion disposed between said shoulders, of a wheel freely rotatable around the axle and having flanges projecting over said shoulders, and a bushing interposed between said wheel and axle, but rotatable with the wheel, said bushing being formed with a plurality of radially extending cells containing graphite, one end of each cell opening upon the face of the bearing portion of the axle, the other end of the cell opening upon the interior face of the wheel, the opposite ends of the bushing being formed with a plurality of longitudinally extending cells containing graphite and opening upon the faces of said shoulders.

2. The combination with the axle of a railway car, said axle being provided at opposite ends with spaced shoulders defining an intermediate bearing portion, of a wheel revolving freely around the axle and having flanges at its ends projecting over said shoulders, the hub of said wheel being provided with an internal bushing surrounding the bearing portion of the axle and fitting between said shoulders, said bushing being rotatable with the wheel and being formed with a plurality of radial cells opening at one end against the bearing portion of the axle and at the other against the internal face of the wheel and adapted to be filled with graphite, said wheel being hollow and formed with passages leading from the exterior of the hub of the wheel to certain of said cells.

3. The combination with the axle of a railway car having a shoulder near one end, a bearing portion disposed beyond said shoulder, and a journal bearing at the extremity of the axle, of a wheel revolving freely around the axle and formed with a hub immediately surrounding the bearing portion of the axle, a bushing interposed between the hub and the axle and carried by the latter, said bushing being formed with a plurality of radial cells adapted to contain lubricant said bushing being integral from one end to the other, the inner face of the hub being formed with circumferential recesses and the bushing having circumferentially extending ribs fit in said recesses and positively preventing any longitudinal movement of the bushing relative to the hub.

4. The combination with a car axle having a shoulder near one end, and a bearing portion disposed beyond said shoulder, the extremity of the hub beyond the bearing portion being reduced, of bearing blocks engaging said reduced portion of the axle, a wheel rotatable around the bearing portion of the axle between the shoulder and the bearing blocks, said wheel having a hub, a bushing interposed between the internal face of the hub and the bearing portion of the axle, and rotating with the hub, said hub being annularly recessed at both ends to receive the shoulder on the axle and the inner ends of the supporting blocks.

5. The combination with the axle of a railway car, said axle having oppositely disposed annular shoulders, the intermediate portion of the axle being gradually enlarged and merging into said shoulders, said axle being formed with bearing portions disposed beyond the shoulders and the extreme ends of the axle being reduced to a diameter smaller than the bearing portions, of a wheel on each end of the axle, and rotatable therearound, the hub of the wheel being recessed at one end to receive the adjacent shoulder on the axle and project inward beyond the same to form a dust guard, and supporting blocks in which the reduced extremity of the axle is received.

6. The combination with a railway car having oppositely disposed depending supporting blocks, said blocks being annularly reduced at their inner ends, of an axle having reduced extremities received within said supporting block and rigidly mounted therein, said axle inward of the reduced portions thereof being provided with bearing portions, oppositely disposed shoulders formed on the axle at the inner end of each bearing portion, the central portion of the axle being outwardly enlarged and merging into said shoulders, a wheel on each end of the axle and rotatable around the same, the hub of said wheel being annularly recessed at its ends to receive at one end the shoulder on the axle, and at the other end receive the reduced portion of the supporting blocks, a bushing interposed between the bearing portion of the axle and each wheel and rotatable with the wheel, said bushing being provided with a plurality of lubricant storage cells extending radially through the bushing and being provided at its ends with a plurality of longitudinally extending lubricant storage cells opening upon the ends of the bushing.

7. The combination with an axle and a wheel rotatable upon the axle, the hub of said wheel being provided at each end with an annular recess and upon its exterior at each end with circumferential dust deflecting grooves, one side of said grooves being coincident with the ends of the hub.

8. The combination with a railway car having oppositely disposed truck hangers the upper and lower hanger blocks supported in said hangers, of an axle, the extremities of the axle being reduced to and fitting within said blocks, means for clamping the blocks upon the reduced portions of the axle to hold the axle from rotation, oppositely disposed shoulders formed upon the axle, independently rotatable wheels surrounding the axle and disposed between the axle shoulders and said supporting blocks, and a bushing interposed between the axle and the interior face of the hub of the wheel, said bushing being provided with a plurality of ribs having interlocking engagement with the hub, and being also provided with a plurality of radially extending lubricant storage cells opening upon the inner face of the bushing.

9. The combination with a railway car, oppositely disposed truck hangers on said car, and oppositely disposed upper and lower hanger blocks supported in said hangers, of an axle, said axle being reduced at its ends for support between said bearing blocks, means for clamping the bearing blocks upon the axle to hold the axle stationary, oppositely disposed shoulders on the axle, the middle portion of the axle gradually enlarging to merge into said shoulders, the axle outward of said shoulders being formed with oppositely disposed bearing portions, oppositely disposed wheels rotatably mounted on the axle, the hub of said wheel at its inner end being recessed to receive the adjacent axle shoulder, the extremity of the hub thereby projecting over the shoulder, the outer end of the hub of each wheel being annularly recessed to project over the reduced portion of the adjacent hanger block, a bushing interposed between the bearing portion of the axle and the hub, and being rotatable with the hub, said bushing bearing at one end against the shoulder of the axle and at its other end bearing against the adjacent bearing block, said bushing being provided with a plurality of radial storage cells and with a plurality of storage cells at its opposite ends, graphite packed within said storage cells, and means for introducing lubricant between the inner face of said bushing and the bearing portion of the axle.

In testimony whereof, I affix my signature in presence of two witnesses.

JOHN A. McLENNAN. [L. S.]

Witnesses:
F. B. WRIGHT,
W. N. WOODSON.